US012781835B2

(12) United States Patent
Kim

(10) Patent No.: US 12,781,835 B2
(45) **Date of Patent: *Nov. 3, 2026**

(54) MOTOR DRIVING DEVICE AND HOLLOW SWIVEL ACTUATOR USING SAME

(71) Applicant: AMOTECH CO., LTD, Incheon (KR)

(72) Inventor: Byung Soo Kim, Incheon (KR)

(73) Assignee: AMOTECH CO., LTD, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/144,956

(22) PCT Filed: Jan. 5, 2024

(86) PCT No.: PCT/KR2024/000240
§ 371 (c)(1),
(2) Date: Jun. 30, 2025

(87) PCT Pub. No.: WO2024/151014
PCT Pub. Date: Jul. 18, 2024

(65) Prior Publication Data

US 2026/0243333 A1 Aug. 20, 2026

(30) Foreign Application Priority Data

Jan. 12, 2023 (KR) ........................ 10-2023-0004999

(51) Int. Cl.
*F16H 19/00* (2006.01)
*F16H 19/08* (2006.01)
(Continued)

(52) U.S. Cl.
CPC ............. *F16H 19/08* (2013.01); *H02K 7/083* (2013.01); *H02K 7/1166* (2013.01); *H02K 11/33* (2016.01); *H02K 21/16* (2013.01); *H02K 2211/03* (2013.01)

(58) Field of Classification Search
CPC F16H 1/16; F16H 1/225; F16H 19/08; H02K 7/1166
See application file for complete search history.

(56) References Cited

U.S. PATENT DOCUMENTS 9,441,729 B2 * 9/2016 Skogward .............. F16H 61/32

FOREIGN PATENT DOCUMENTS

CN 112848980 A 5/2021
CN 216618421 U * 5/2022
(Continued)

OTHER PUBLICATIONS

International Search Report—PCT/KR2024/000240 dated Apr. 12, 2024.

*Primary Examiner* — Gregory Robert Weber
(74) *Attorney, Agent, or Firm* — CANTOR COLBURN LLP

(57) ABSTRACT

Provided is a motor driving device capable of supporting a large load and a hollow swivel actuator using same. The swivel actuator includes: an actuator housing having, at the center thereof, a hollow cylindrical portion protruding upwards; first and second motor driving units disposed to face the hollow cylindrical portion and having first and second worm gears integrally formed at the centers of first and second rotary shafts, the worm gears generating rotational outputs of first to fourth driving motors; a sun gear rotatably supported on the outer circumference of the hollow cylindrical portion and having a worm wheel integrally formed on the outer circumference thereof and gear-coupled to the first and second worm gears to allow deceleration; and a rotary table having the center part thereof rotatably supported on the outer circumference of the hollow cylindrical portion.

15 Claims, 14 Drawing Sheets

(51) Int. Cl.

| | |
|---|---|
| ***H02K 7/08*** | (2006.01) |
| ***H02K 7/116*** | (2006.01) |
| ***H02K 11/33*** | (2016.01) |
| ***H02K 21/16*** | (2006.01) |

(56) References Cited

FOREIGN PATENT DOCUMENTS

| | | | | | |
|---|---|---|---|---|---|
| KR | 20110069456 | A | | 6/2011 | |
| KR | 20160099787 | A | | 8/2016 | |
| KR | 20210083196 | A | * | 7/2021 | ............. H02K 7/116 |
| KR | 20220056821 | A | | 5/2022 | |
| KR | 20220134445 | A | | 10/2022 | |

* cited by examiner

【FIG. 1】
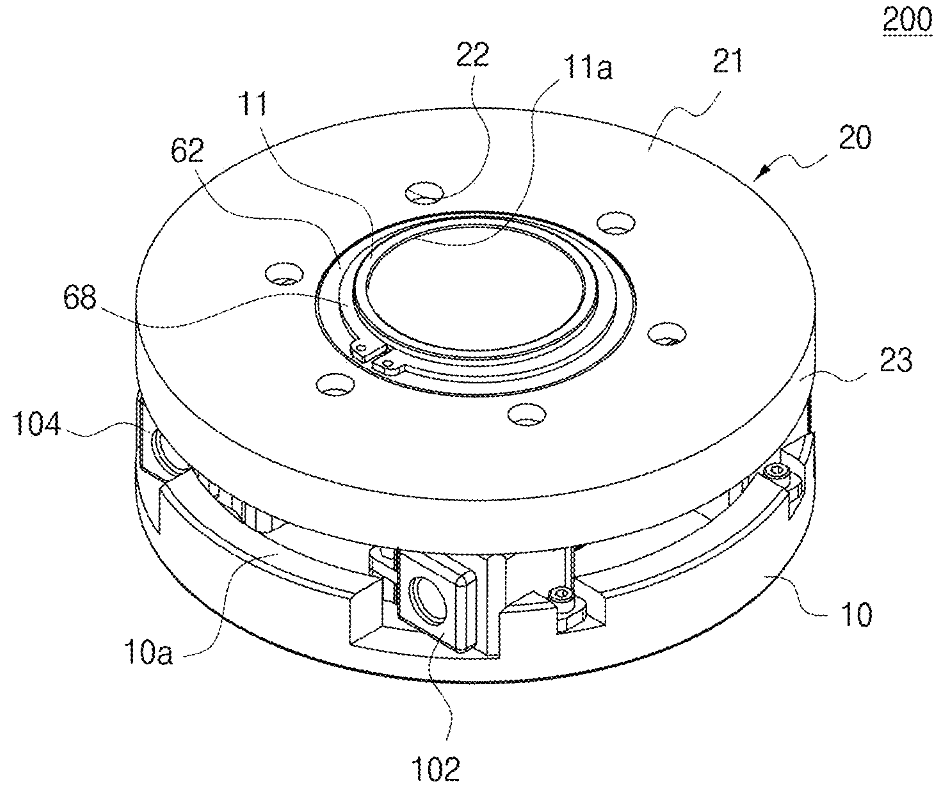

【FIG. 2】
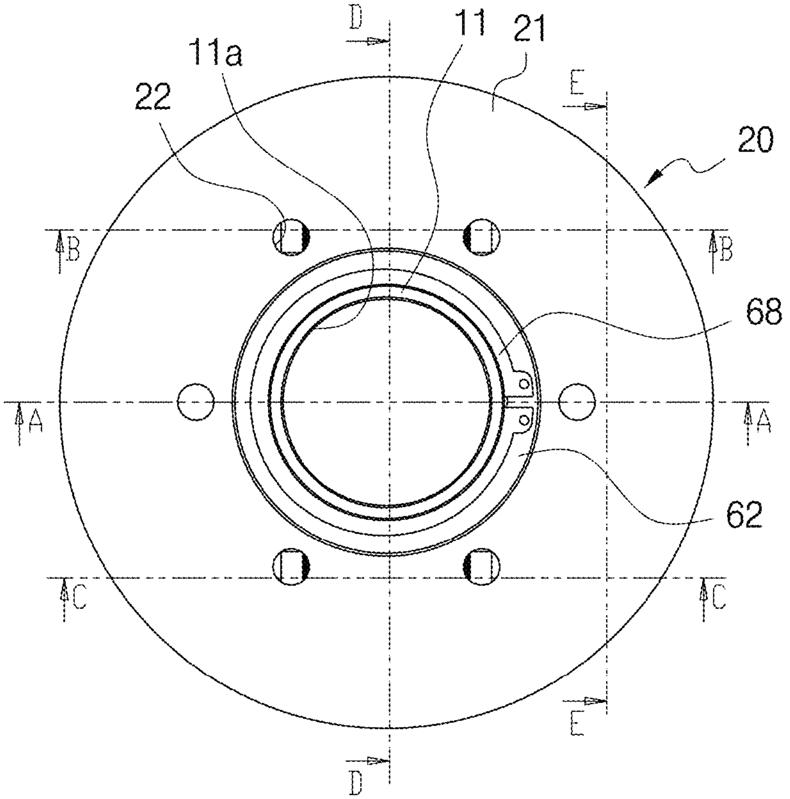

【FIG. 3A】
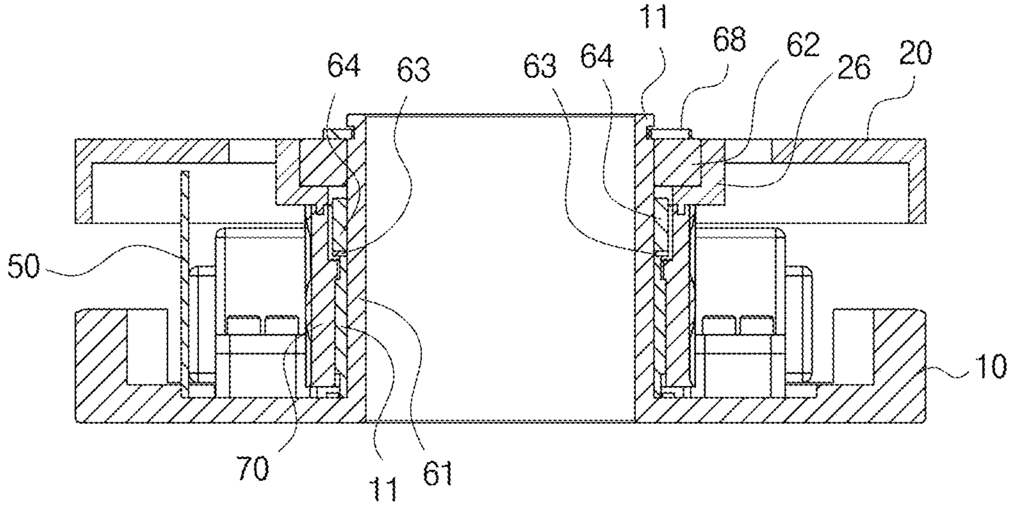
【FIG. 3B】
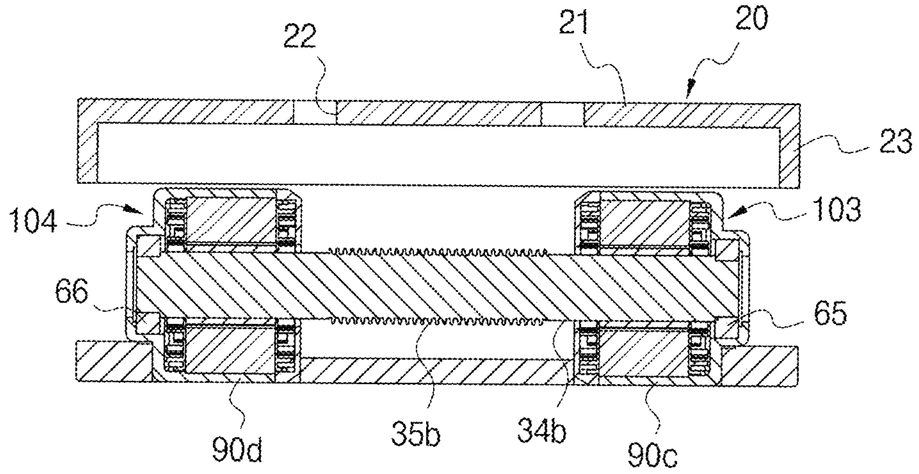

【FIG. 3C】
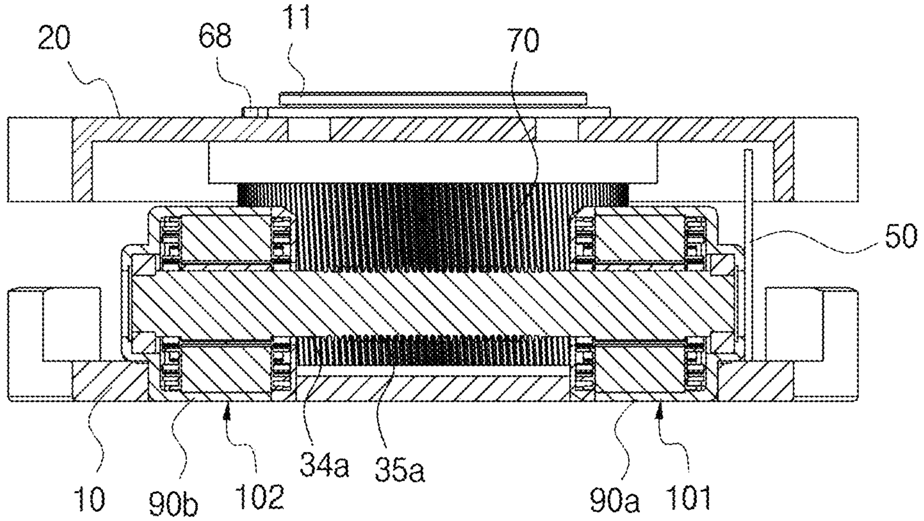
【FIG. 3D】
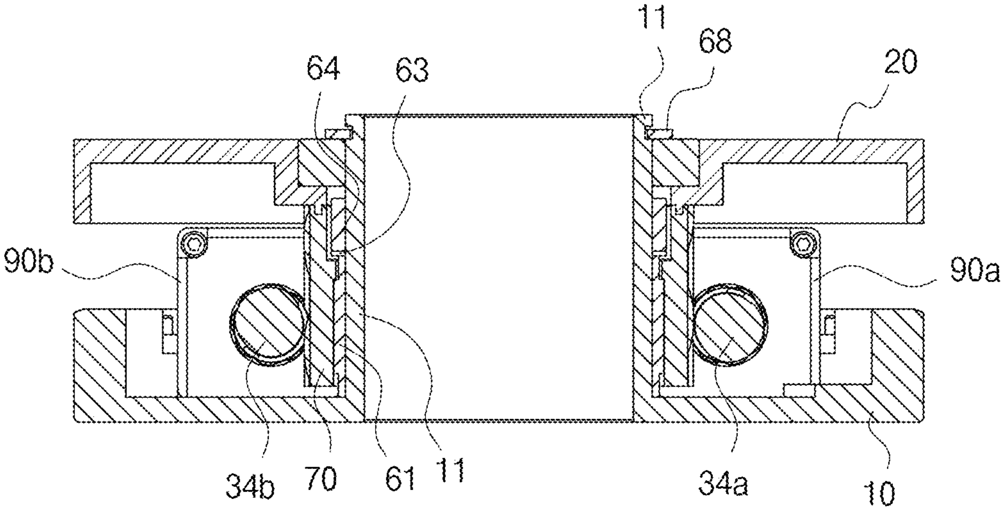

【FIG. 3E】
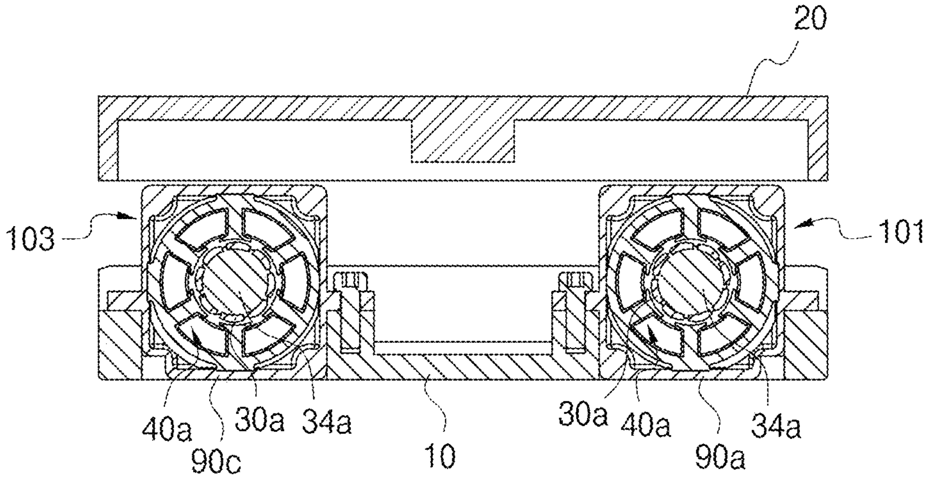

【FIG. 4】
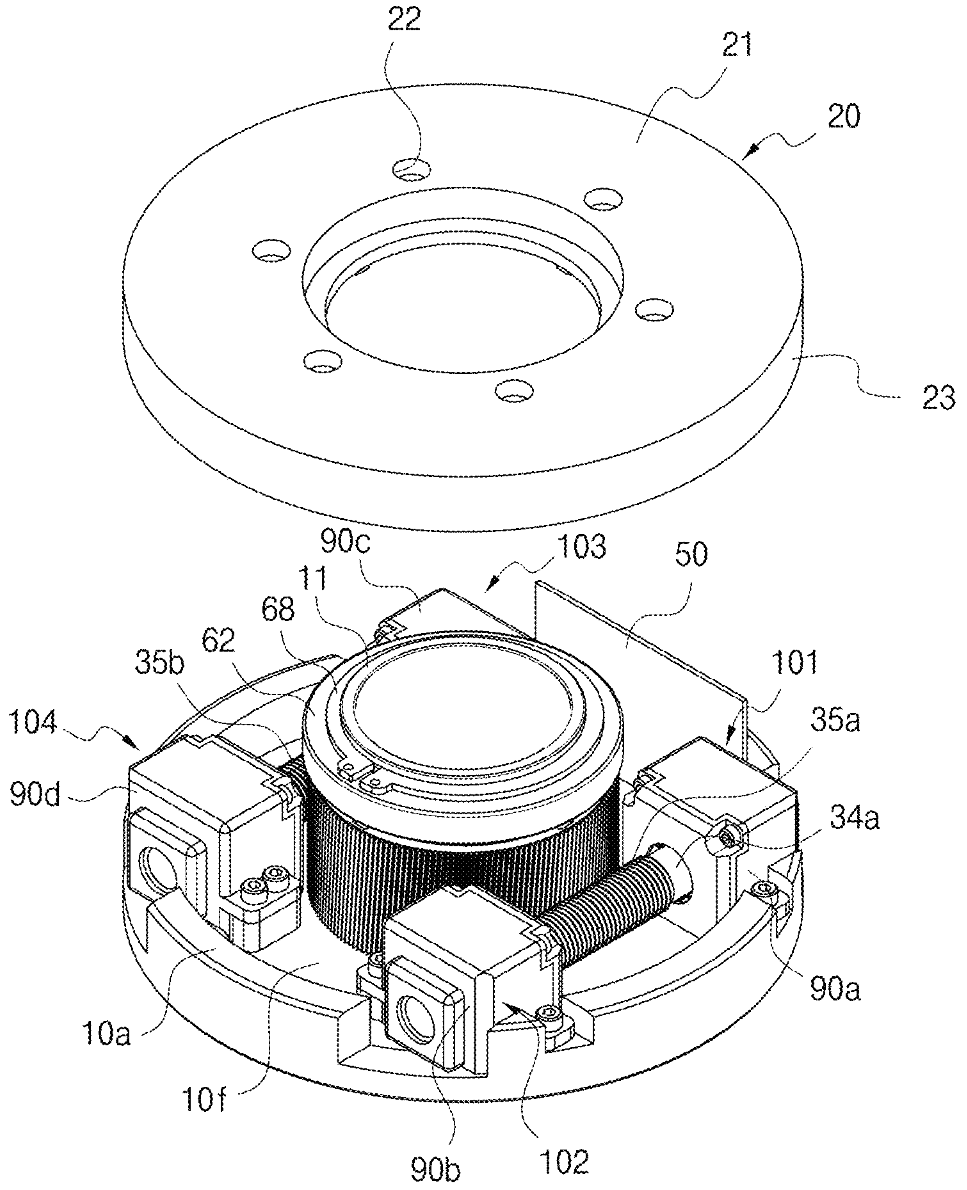

【FIG. 5】
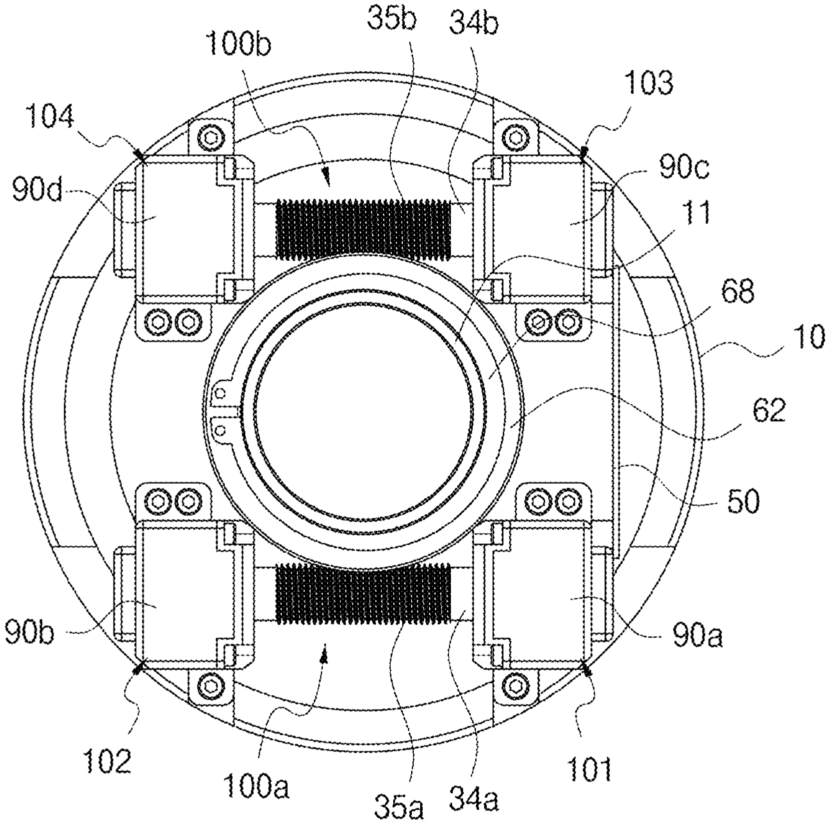

【FIG. 6】
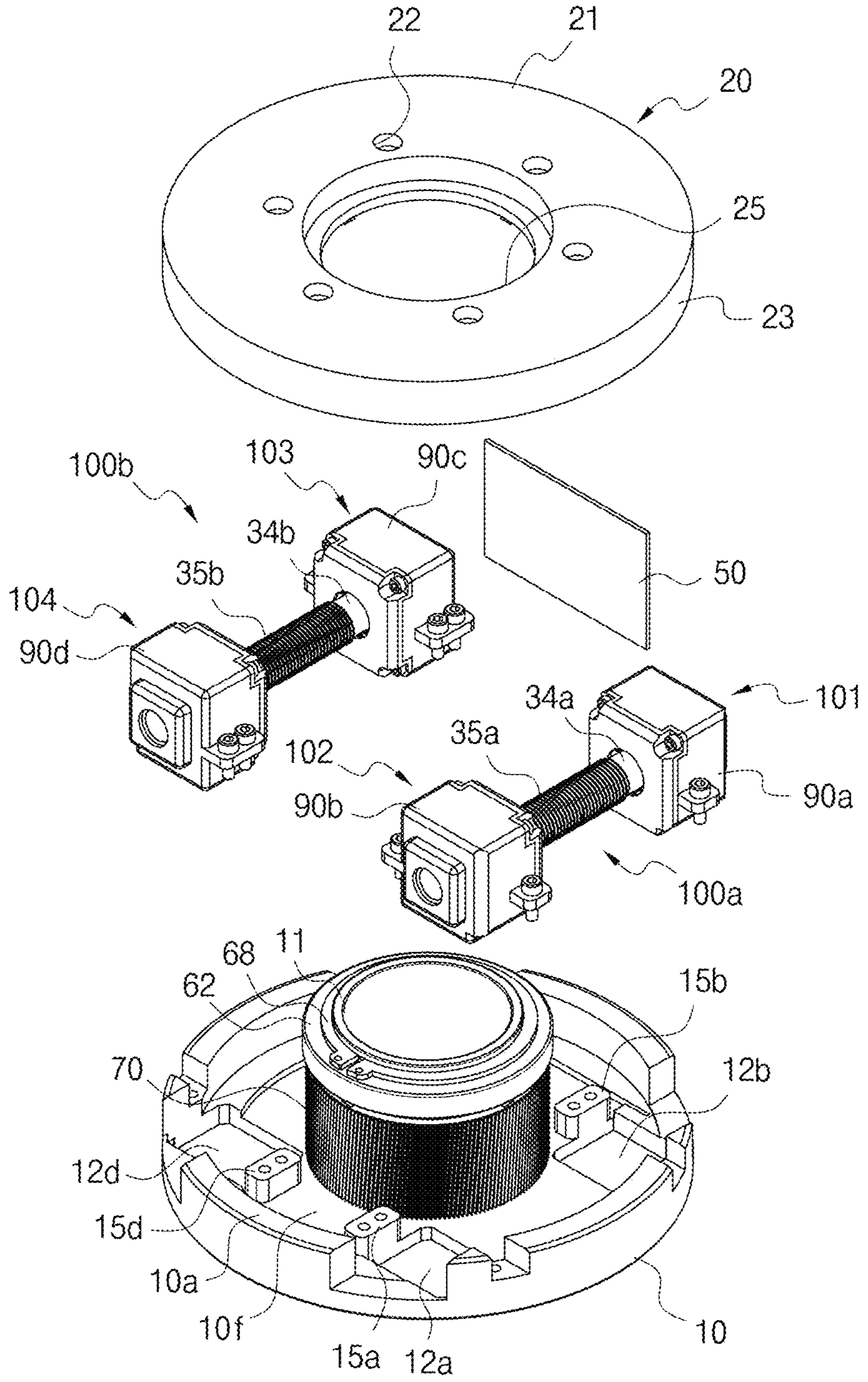

【FIG. 7】
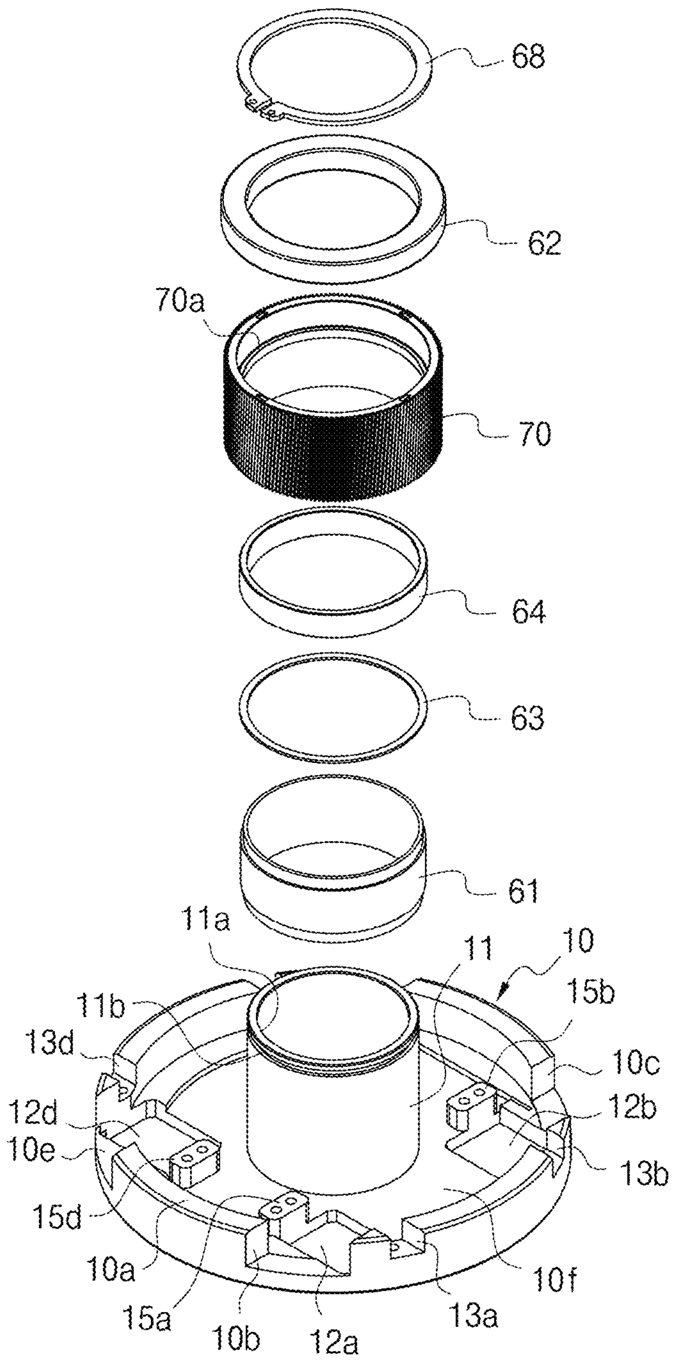

【FIG. 8A】
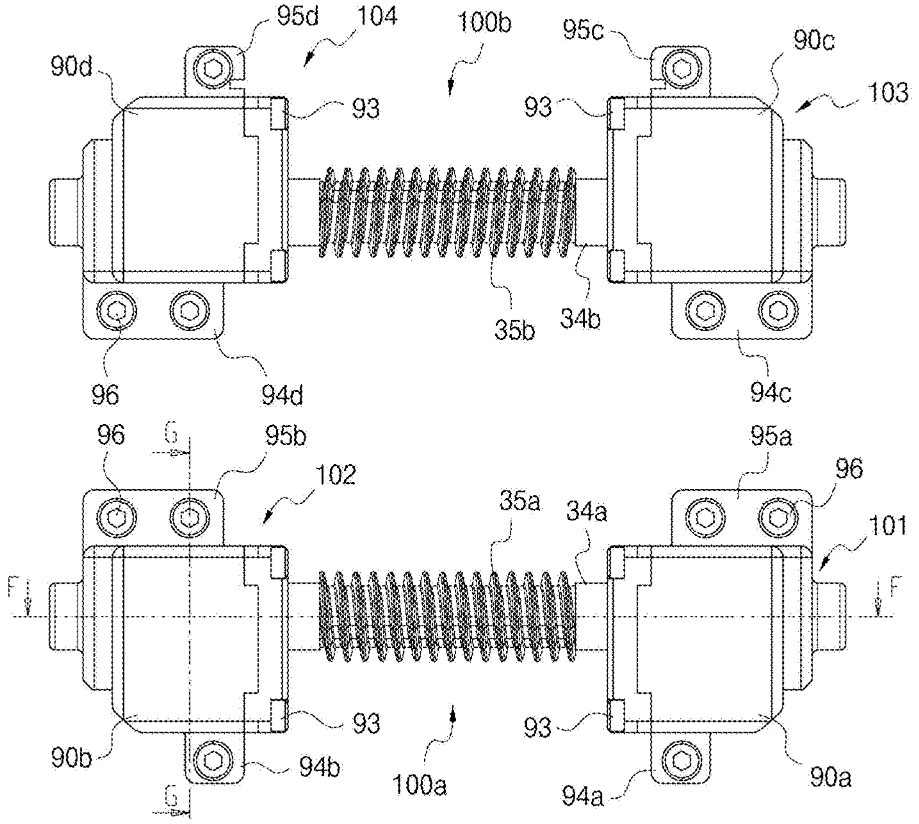
【FIG. 8B】
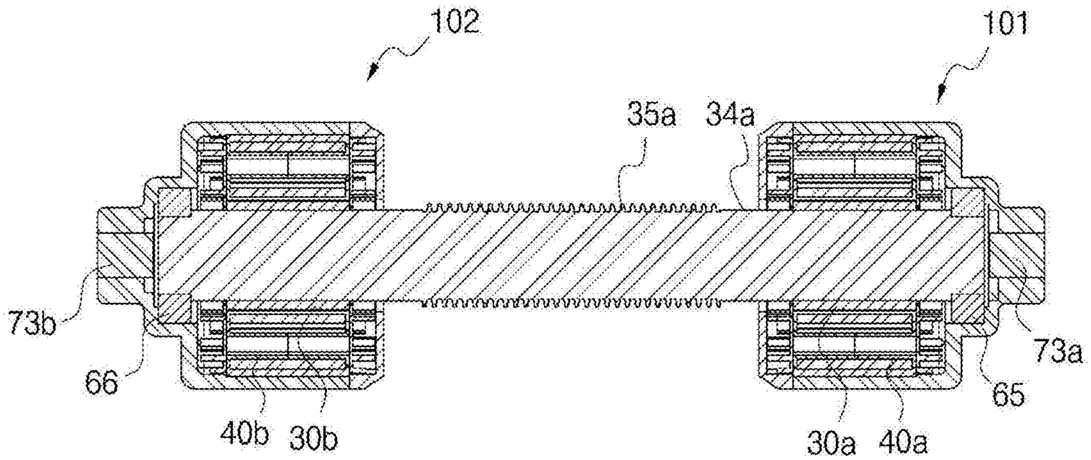

【FIG. 8C】
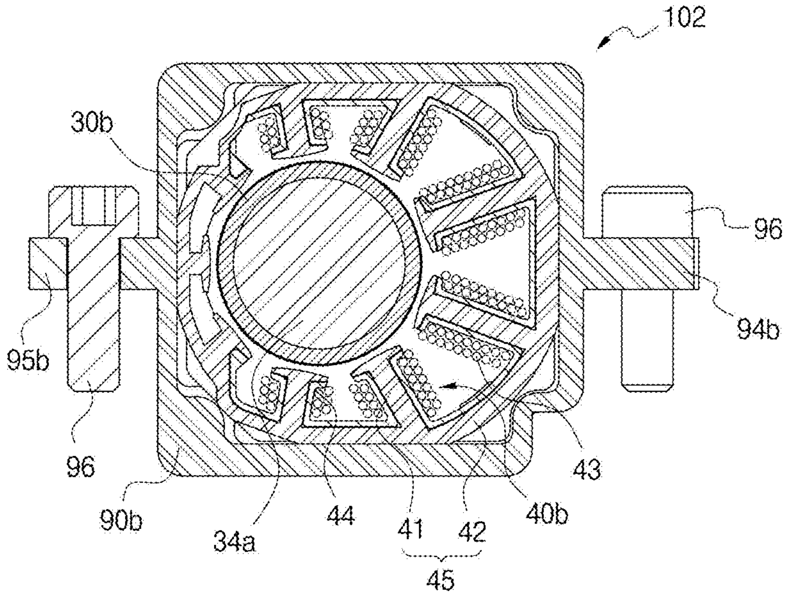
【FIG. 8D】
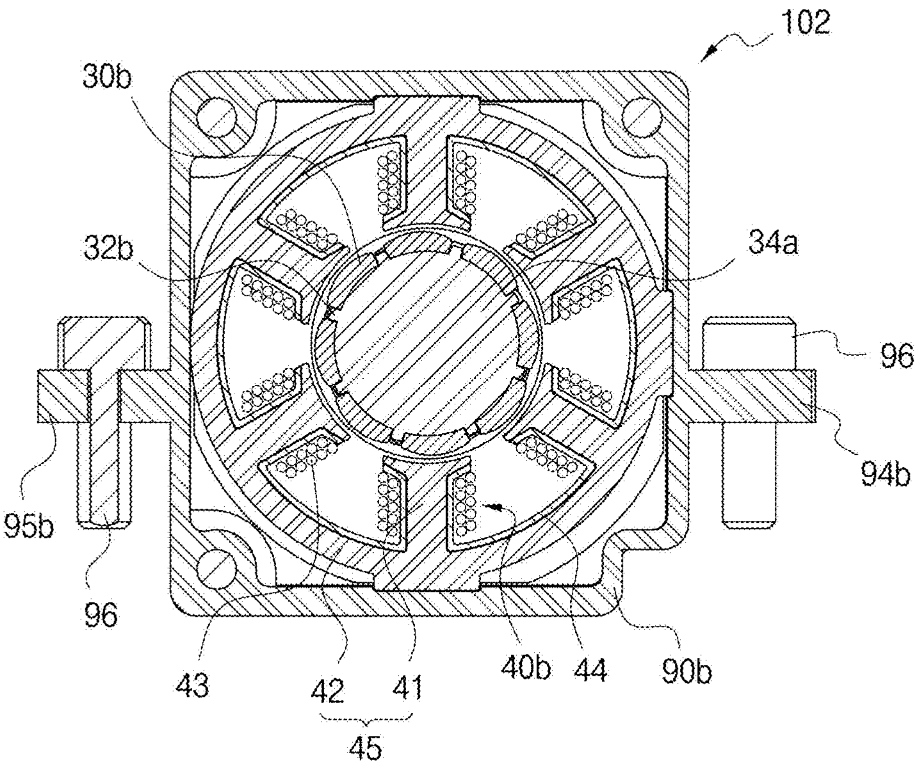

【FIG. 8E】
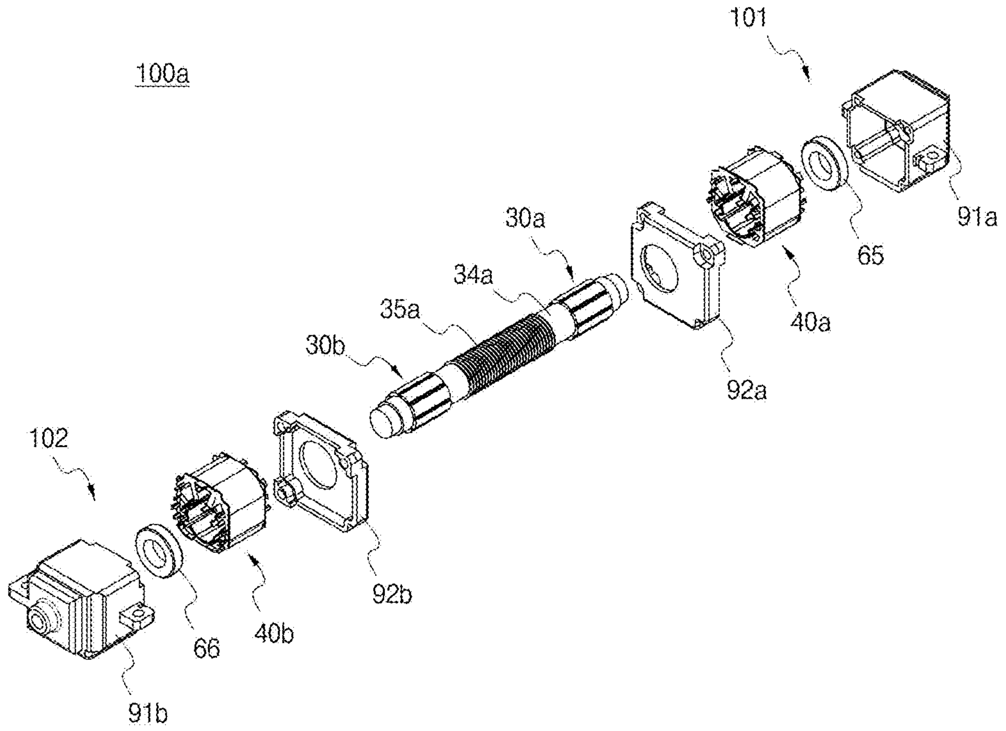
【FIG. 8F】
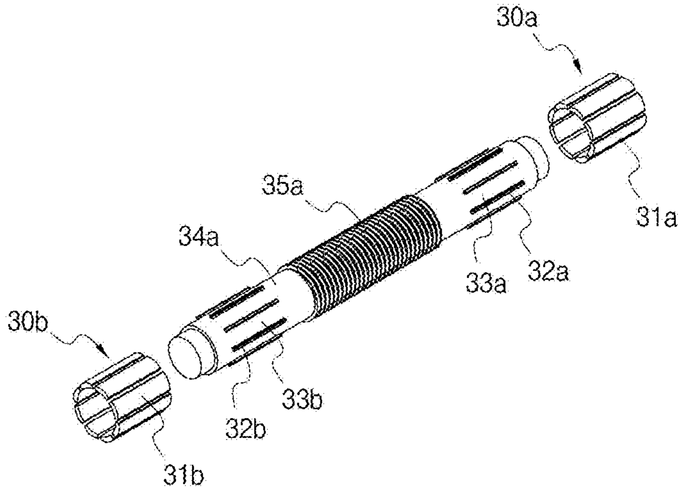

【FIG. 9A】
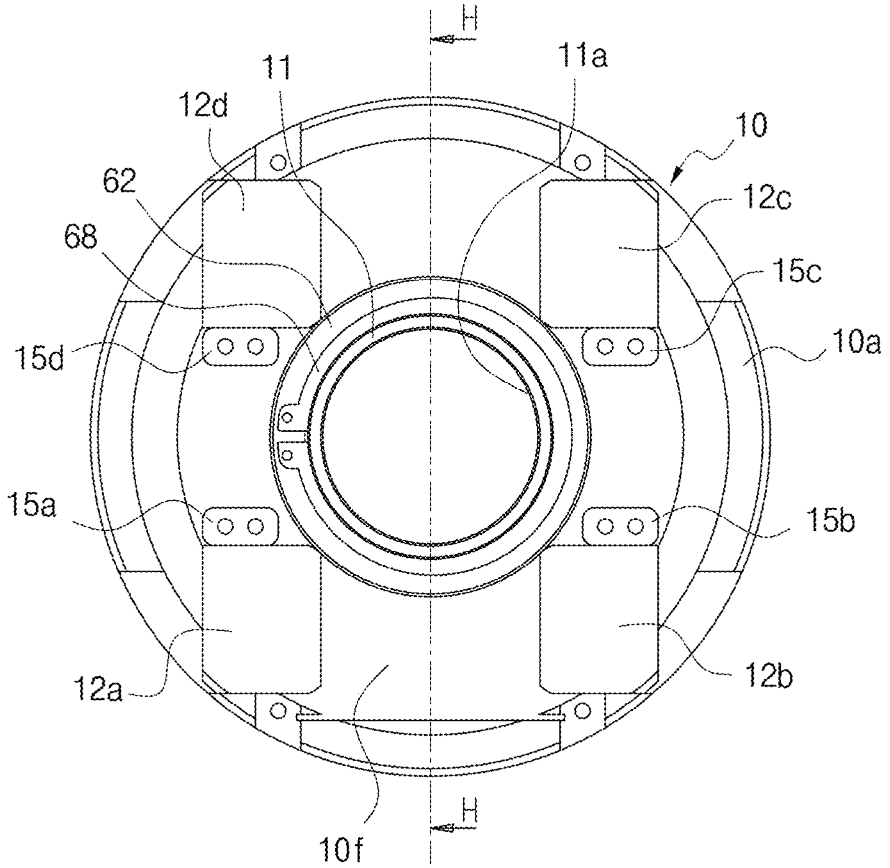

【FIG. 9B】
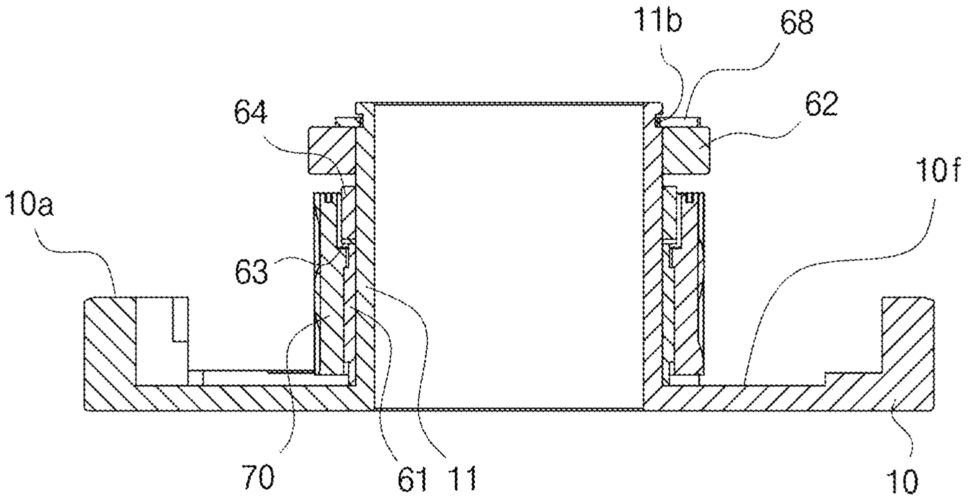

MOTOR DRIVING DEVICE AND HOLLOW SWIVEL ACTUATOR USING SAME

TECHNICAL FIELD

The present invention relates to a hollow swivel actuator, and more particularly, to a motor driving device capable of stably driving a sun gear by transmitting rotational forces of first and second motor driving units to a sun gear through first and second worm gears, and a hollow swivel actuator using same.

BACKGROUND ART

An electric actuator rotates or linearly moves a passive object to be driven with a high torque rotational force obtained by torque conversion of the rotational force generated from a rotating power source.

Meanwhile, in recent years, a swivel actuator has been used to rotate a main body of a driven object (i.e., a car seat) from side to side along with a rotary table as an actuator for rotating a vehicle car seat from side to side.

Considering that conventional actuators use direct-current (DC) motors lying inside low-height housing, a swivel actuator with a compact and slim structure, by installing a core motor-type brushless direct-current (BLDC) motor vertically on the bottom of the housing and installing a reduction gear train on the top thereof is proposed in Korean Patent Application Publication No. 10-2022-0056821 (Patent Document 1).

However, Patent Document 1 has a problem in that a housing structure is complex and the overall slim structure cannot be realized as a driving motor is placed at the bottom of the housing, a reducer is placed at the middle end thereof, and a rotary table is placed at the top thereof.

In addition, various types of reducers are applied for torque conversion, among which a cycloid type reducer has the advantages of high deceleration ratio and low backlash compared to size, but due to its complex structure, mass productivity is poor and miniaturization and slim structure cannot be realized.

Further, in the related art, since the rotational force is provided to the gear terminal of the reducer through the worm gear integrally formed with the output shaft by using one driving motor disposed at the side of the reducer, when the driving motor is assembled to a reducer gear module, the outer shape of an actuator increases toward a side, and when the force is received, the output shaft of the driving motor is biased to the side, and thus the force may not be supported.

DISCLOSURE

Technical Problem

To solve the conventional art problems, it is an objective of the present invention to provide a motor driving device capable of stably driving a sun gear by transmitting rotational forces of first and second motor driving units to a sun gear through first and second worm gears, and a hollow swivel actuator using same.

It is another objective of the present invention to provide a motor driving device and a hollow swivel actuator using same, wherein first and second worm gears of first and second motor driving units are gear-coupled to face a sun gear positioned at the central portion of an actuator housing, and a rotary table is directly coupled to an upper portion of the sun gear, thereby simplifying the overall structure and realizing a slim structure.

It is another objective of the present invention to provide a motor driving device capable of realizing a slim structure by arranging a motor driving unit and a sun gear on the same plane inside a cylindrical housing, and a hollow swivel actuator using same.

It is another objective of the present invention to provide a hollow swivel actuator that provides a structure capable of preventing damage even if a large external force is applied by stably accommodating and supporting a motor housing of a motor driving unit in an actuator housing.

It is another objective of the present invention to provide a hollow swivel actuator capable of removing tolerance generated when coupling between gears and enabling a backlash to be zero by suppressing left and right displacements in a motor housing by using a set screw on both ends of first and second rotary shafts.

Technical Solution

According to an aspect of the present invention, there is provided a motor driving device for a hollow swivel actuator including: an actuator housing having a hollow cylindrical portion protruding upward at a center thereof; and first and second motor driving units disposed on both sides of a bottom surface of the actuator housing to face the hollow cylindrical portion, wherein the first motor driving unit includes: a first rotary shaft in which a first worm gear, in which a rotational output of a driving motor is generated, is integrally formed at a central portion thereof; and first and second driving motors respectively formed at both ends of the first rotary shaft to rotate the first rotary shaft, and the second motor driving unit includes: a second rotary shaft in which a second worm gear, in which a rotational output of a driving motor is generated, is integrally formed at a central portion thereof; and third and fourth driving motors respectively formed at both ends of the second rotary shaft to rotate the second rotary shaft, wherein the first and second worm gears are gear-coupled to a sun gear rotatably supported on an outer circumference of the hollow cylindrical portion.

The first and second driving motors include: the first rotary shaft in which the first worm gear, in which a rotational output is generated, is integrally formed at a central portion thereof; first and second motor housings for accommodating both ends of the first rotary shaft, respectively; first and second rotors having magnets attached to outer circumferential portions of both end portions of the first rotary shaft, respectively; and first and second stators arranged on the outer sides of the first and second rotors with air gaps and generating rotating magnetic fields to rotate the first rotary shaft of the first and second rotors, respectively.

The motor driving device according to the present invention may further include first and second bearings installed inside the first and second motor housings to rotatably support the first rotary shaft; and first and second set screws which are assembled by being screw-coupled to both ends of the first and second motor housings, respectively, and enable the front ends to press and support the ends of the first rotary shaft to suppress the flow of the first rotary shaft.

Both end portions of the first and second motor housings may be assembled to partially overlap first and second grooves formed on a circular wall of an actuator housing, and the first and second set screws may be manipulated using a driver from the outside.

In this case, the first rotary shaft is divided into three or two central portions where the first and second rotors and the worm gear are formed, and may be assembled using a D-cut structure.

Moreover, the first and second motor housings in the motor driving device according to the present invention may further include first and second brackets protruding inside and outside and used to fix the first and second motor housings to the actuator housing, respectively.

The first bracket protruding from the outside of each of the first and second motor housings may be assembled and fixed to overlap third and fourth grooves formed in the circular wall of the actuator housing, and the second bracket protruding from the inside of each of the first and second motor housings may be fixed to each of first and second protruding fixing portions protruding from the bottom surface of the actuator housing.

Further, the motor driving device according to the present invention may further include first and second through-holes in which the first and second motor housings are assembled such that the bottom surfaces of the first and second motor housings are flush with the rear surface of the actuator housing when the first and second motor housings are assembled to the bottom surface of the actuator housing.

Each of the first and second stators includes: a plurality of teeth each having a T-shape and a back yoke interconnected to the plurality of teeth to form a magnetic circuit; a bobbin integrally formed to surround an outer circumferential surface on which a coil of each of the plurality of teeth is wound; and a coil wound around the outer circumferential surface of the bobbin, wherein the plurality of teeth and the back yoke may have an asymmetric structure.

According to another aspect of the present invention, there is provided a motor driving device for a hollow swivel actuator including: an actuator housing having a hollow cylindrical portion protruding upward at a center thereof; and first and second motor driving units which are disposed on both sides of the bottom surface of the actuator housing to face the hollow cylindrical portion, respectively, and which include first to fourth driving motors formed at both ends of the first and second rotary shafts, respectively, and first and second worm gears, which generate rotational outputs of the first to fourth driving motors, and are integrally formed at the centers of the first and second rotary shafts, respectively, wherein the first and second worm gears are gear-coupled to a sun gear rotatably supported on an outer circumference of the hollow cylindrical portion.

According to another aspect of the present invention, there is provided a hollow swivel actuator including: an actuator housing having a hollow cylindrical portion protruding upward at a center thereof; first and second motor driving units which are disposed on both sides of the bottom surface of the actuator housing to face the hollow cylindrical portion, respectively, have first to fourth driving motors formed at both ends of the first and second rotary shafts, respectively, and first and second worm gears, which generate rotational outputs of the first to fourth driving motors, and are integrally formed at the centers of the first and second rotary shafts, respectively; a sun gear rotatably supported on the outer circumference of the hollow cylindrical portion and having a worm wheel integrally formed on the outer circumference thereof and gear-coupled to the first and second worm gears to allow deceleration; and a rotary table having the center part thereof rotatably supported on the outer circumference of the hollow cylindrical portion, the lower end of the center part being coupled to the top end of the sun gear.

The swivel actuator according to the present invention may further include: a first bearing arranged between the lower end of the hollow cylindrical portion and the sun gear to rotatably support the sun gear; a second bearing rotatably supporting the rotary table on an outer circumference of a top end of the hollow cylindrical portion; and a bearing support press-coupled to the outer circumference of the hollow cylindrical portion and disposed between the first bearing and the second bearing.

In this case, the first bearing may include a needle roller bearing, and the second bearing may include a ball bearing.

In addition, the first and second driving motors and the plurality of pinion gears of the motor driving device may be disposed on the same plane on the bottom surface of the actuator housing.

The swivel actuator according to the present invention may further include a motor driving circuit mounted on a printed circuit board (PCB) installed inside the actuator housing to apply a motor driving signal to the first and second driving motors according to manipulation of a user's car seat control button, and the rotary table may be used for rotation driving of a car seat.

Advantageous Effects

As described above, in the present invention, the rotational forces of the first and second motor driving units are transmitted to the sun gear through the first and second worm gears, thereby stably driving the sun gear to support a large load.

In addition, in the present invention, the first and second worm gears of the first and second motor driving units are gear-coupled to face the sun gear located at the central portion of the actuator housing, and the rotary table is directly coupled to the upper portion of the sun gear, thereby simplifying the overall structure and realizing a slim structure.

Furthermore, in the present invention, a slim structure may be realized by arranging a motor driving unit and a sun gear on the same plane inside a cylindrical housing.

Furthermore, in the present invention, it is possible to prevent damage even if a large external force is applied by stably accommodating and supporting the motor housings of the first and second motor driving units in the actuator housing.

In the present invention, both ends of the rotary shaft of the motor driving unit are used to suppress left and right displacements in a motor housing by using a set screw, thereby eliminating tolerance generated during coupling between gears and making a backlash zero.

Moreover, in the present invention, the length of one motor is divided into two parts, and two bearings are arranged at both ends of a rotary shaft, thereby realizing a structure capable of achieving uniform distribution of force and stably accommodating force.

In addition, in the present invention, a worm gear is arranged at the central portions of the first and second rotary shafts rotated by the first and second driving units to drive the sun gear, thereby having a more stable structure against vibration and noise.

The first to fourth driving motors are respectively formed in first to fourth motor housings fixedly installed at both sides of the actuator housing, and both ends of the first and second rotary shafts are rotatably supported by four bearings arranged inside the first to fourth motor housings, respectively, thereby providing stability when driving the worm gear.

Further, the present invention provides a motor driving device for driving a plurality of driving motors using a single motor driving circuit (i.e., a motor controller).

BRIEF DESCRIPTION OF THE DRABLADES

FIGS. 1 and 2 are respectively a perspective view and a plan view of a hollow swivel actuator according to a preferred embodiment of the present invention.

FIGS. 3A to 3E are cross-sectional views taken along line A-A, line B-B, line C-C, line D-D, and line E-E of FIG. 2, respectively.

FIG. 4 is an exploded perspective view illustrating that a rotary table is separated from a hollow swivel actuator according to a preferred embodiment of the present invention, and FIG. 5 is a plan view of FIG. 4 in which the rotary table has been removed.

FIG. 6 is a module—each exploded perspective view and a fully exploded perspective view of a hollow swivel actuator according to a preferred embodiment of the present invention, and FIG. 7 is a fully exploded perspective view of FIG. 6 in which a motor driving unit and a rotary table have been removed.

FIG. 8A is a plan view of a motor driving device according to a preferred embodiment of the present invention, FIG. 8B is a cross-sectional view taken along line F-F of FIG. 8A, FIGS. 8C and 8D are cross-sectional views taken along line G-G of FIG. 8A, FIG. 8E is an exploded perspective view, and FIG. 8F is an exploded perspective view of a rotary shaft and a magnet.

FIGS. 9A and 9B are a plan view of FIG. 7 and a cross-sectional view taken along line H-H of FIG. 9A, respectively.

BEST MODE FOR CARRYING OUT THE INVENTION

Hereinafter, embodiments of the present disclosure will be described in detail with reference to the accompanying drawings.

The sizes and shapes of the components shown in the drawings may be exaggerated for clarity and convenience. In addition, terms defined in consideration of the configuration and operation of the present disclosure may vary depending on the intention or custom of the user, the operator, and the like. Definitions of these terms should be based on the content of this specification.

A hollow swivel actuator according to the present invention is used, together with a rotary table, to rotate a driven body, that is, a vehicle car seat, left and right. When a swivel actuator is installed in a lower plate fixed to a bottom surface of a vehicle and a car seat is fixedly installed in a rotary table, the car seat may also be rotated according to the rotation of the rotary table.

In the following description, a hollow swivel actuator that drives a car seat as a driven body using a BLDC-type driving motor as a power source is described.

A hollow swivel actuator according to the present invention includes a single actuator housing, a motor driving device, a sun gear, and a rotary table fixed to an upper portion of the sun gear, which are integrally combined with each other, and thus may achieve miniaturization and slimness while solving the problem of the prior art.

In addition, a hollow swivel actuator according to the present invention is formed in a disc shape, and includes a through-hole for withdrawing a cable, which is formed in a central portion thereof as an inner hollow shape, and a plurality of coupling holes, for example, three to six coupling holes, which are formed on an upper portion of a rotating body (a rotary table) so as to be connected to a passive object, in which a lower end portion of a fixing bolt passes through each of the coupling holes so as to be screw-coupled to and fixed to a stud nut fixedly installed on an inner surface of the rotary table.

First, referring to FIGS. 1 to 7, a hollow swivel actuator 200 according to a preferred embodiment of the present invention includes: an actuator housing 10 having a hollow cylindrical portion 11 protruding upward at a center thereof; first and second motor driving units 100*a* and 100*b* which are disposed on both sides of the bottom surface 10*f* of the actuator housing 10 to face the hollow cylindrical portion 11, respectively, and which include first to fourth driving motors 101 to 104 formed at both ends of a common rotary shaft 34, respectively, and first and second worm gears 35*a* and 35*b*, which generate rotational outputs of the first to fourth driving motors 101 to 104, and are integrally formed at the centers of first and second rotary shafts 34*a* and 34*b*, respectively; a sun gear 70 rotatably supported on the outer circumference of the hollow cylindrical portion 11 and having a worm wheel integrally formed on the outer circumference thereof and gear-coupled to the first and second worm gears 35*a* and 35*b* to allow deceleration; and a rotary table 20 having a central portion fixed to an upper portion of the sun gear 70 and rotatably supported on an upper end portion of the hollow cylindrical portion 11.

Hereinafter, the hollow swivel actuator 200 will be described in detail.

First, the first and second motor driving units 100*a* and 100*b* are disposed in opposition to each other at both sides of the bottom surface 10*f* of the actuator housing 10 to form a motor driving device.

The first motor driving unit 100*a* includes first and second driving motors 101 and 102 formed at both ends of the first rotating shaft 34*a*, respectively. The first worm gear 35*a* generating the rotational outputs of the first and second driving motors 101 and 102 is integrally formed at the center of the first rotational shaft 34*a*. The second motor driving unit 100*b* includes third and fourth driving motors 103 and 104 formed at both ends of the second rotating shaft 34*b*, respectively. The second worm gear 35*b*, which generates the rotational outputs of the third and fourth driving motors 103 and 104, is integrally formed at the center of the second rotational shaft 34*b*.

The hollow cylindrical portion 11 having a through-hole 11*a* formed at the center thereof protrudes from a center of the actuator housing 10, and a circular wall 10*a* protrudes from an outer circumferential portion of the hollow cylindrical portion 11. First to fourth concave grooves 10*b* to 10*e*, which are cut such that the first to fourth motor housings 90*a* to 90*d* partially overlap when the first to fourth driving motors 101 to 104 of the first and second motor driving devices 100*a* and 100*b* are installed, are spaced apart at intervals from each other at both sides of the circular wall 10*a*. Fifth to eighth concave grooves 13*a* to 13*d* for fixing the first to fourth motor housings 90*a* to 90*d* to the circular wall 10*a* of the actuator housing 10 by using fixing bolts 96 are arranged at adjacent portions of the first to fourth concave grooves 10*b* to 10*e*.

In addition, both ends of the first to fourth motor housings 90*a* to 90*d* have stepped portions formed to have a smaller size toward the rear end portions thereof, and stepped portions corresponding to the stepped portions of the first to fourth motor housings 90*a* to 90*d* are also formed inwards in the circular wall 10*a* on which the first to fourth concave grooves 10$b$ to 10$e$ are formed. Accordingly, as shown in FIGS. 3E and 4, the contact area between the first to fourth motor housings 90$a$ to 90$d$ and the actuator housing 10 is increased to stably support the first to fourth motor housings 90$a$ to 90$d$.

When the first to fourth motor housings 90$a$ to 90$d$ are installed in the actuator housing 10, first to fourth through-holes 12$a$ to 12$d$ are formed on the bottom surface 10$f$ of the actuator housing 10, and the first and second motor housings 90$a$ and 90$b$ are assembled such that the bottom surfaces of the first to fourth motor housings 90$a$ to 90$d$ are flush with the rear surface of the actuator housing 10, to thereby reduce the thickness of the swivel actuator 200 as much as possible.

First and second brackets 94$a$ and 94$b$ may protrude from one side of the first to fourth motor housings 90$a$ to 90$d$, respectively, and one fixing bolt 96 may be fastened to each of the first and second brackets 94$a$ and 94$b$ such that the first and second brackets 94$a$ and 94$b$ are fixed to the fifth to eighth concave grooves 13$a$ and 13$d$, respectively.

In addition, third and fourth brackets 95$a$ and 95$b$ protrude from the other sides of the first to fourth motor housings 90$a$ to 90$d$, respectively, and first to fourth protruding fixing portions 15$a$ to 15$d$ for fixing motors corresponding to the third and fourth brackets 95$a$ and 95$b$ protrude from the bottom surface 10$f$ of the actuator housing 10. Through-holes are formed in the third and fourth brackets 95$a$ and 95$b$ to fasten at least two fixing bolts 96 to the first to fourth protruding fixing portions 15$a$ to 15$d$.

Moreover, as shown in FIG. 8B, a pair of bearings 65 and 66 for rotatably supporting the first and second rotation shafts 34$a$ and 34$b$ of the first to fourth driving motors 101 to 104 are embedded in both ends of the first to fourth motor housings 90$a$ to 90$d$.

In this case, it is preferable to prevent bending or damage inflicted to the first to fourth motor housings 90$a$ to 90$d$ supporting the pair of bearings 65 and 66 due to a large external pressure, by using the first and second worm gears 35$a$ and 35$b$ to increase brake torque when the first and second motor driving units 100$a$ and 100$b$ generate rotational outputs. To this end, the present invention is designed to disperse external pressure while firmly supporting the first to fourth motor housings 90$a$ to 90$d$ in the actuator housing 10.

In the present invention, the first to fourth driving motors 101 to 104 of the first and second motor driving units 100$a$ and 100$b$ are assembled such that both ends of the first to fourth motor housings 90$a$ to 90$d$ partially overlap the first to fourth concave grooves 10$b$ to 10$e$, respectively, to prevent bending or damage of the first to fourth motor housings 90$a$ to 90$d$ caused due to a large external pressure, the first and second brackets 94$a$ and 94$b$ are fixed to the fifth to eighth concave grooves 13$a$ to 13$d$ using fixing bolts 96, respectively, and third and fourth brackets 95$a$ and 95$b$ are fixed to the first to fourth protruding fixing portions 15$a$ to 15$d$ using at least two fixing bolts 96.

The first to fourth driving motors 101 to 104 of the first and second motor driving units 100$a$ and 100$b$, for example, generate relatively high-speed rotational power, transmit the rotational power to the sun gear 70, reduce the rotational speed thereof from the high speed rotational power, and transmit the reduced rotational speed to the rotary table 20, thereby performing torque conversion and generating reduced rotational power having increased torque.

As shown in FIGS. 8A to 8F, the first and second motor driving units 100$a$ and 100$b$ have first to fourth driving motors 101 to 104 formed at both ends of the rotating shaft 34, respectively, and first and second worm gears 35$a$ and 35$b$ generating rotational outputs of the first to fourth driving motors 101 to 104 which are integrally formed at the centers of the first and second rotating shafts 34$a$ and 34$b$. As a result, the first and second worm gears 35$a$ and 35$b$ are respectively formed at the centers of the first and second rotation shafts 34$a$ and 34$b$, which are rotatably driven by the first to fourth driving motors 101 to 104 having a symmetrical structure, and the outer circumferences of the first and second worm gears 35$a$ and 35$b$ are gear-coupled to the sun gear 70 formed of a worm wheel.

The first and second worm gears 35$a$ and 35$b$ respectively formed at the centers of the first and second rotary shafts 34$a$ and 34$b$ of the first and second motor driving units 100$a$ and 100$b$ are disposed in opposition to each other on both sides of the sun gear 70.

In the related art, since the rotational force is provided to the gear terminal of the reducer through the worm gear integrally formed with the output shaft by using one driving motor disposed at the side of the reducer, when the driving motor is assembled to a reducer gear module, the outer shape of an actuator increases toward a side, and when the force is received, the output shaft of the driving motor is biased to the side, and thus the force may not be supported.

However, in the present invention, the first and second worm gears 35$a$ and 35$b$ disposed at the central portions of the first and second rotary shafts 34$a$ and 34$b$ are driven by the first to fourth driving motors 101 to 104 installed at both ends of the first and second rotary shafts 34$a$ and 34$b$ to stably drive the sun gear 70 on both sides thereof, thereby supporting a large load.

In addition, the first to fourth driving motors 101 to 104 are respectively formed in the first to fourth motor housings 90$a$ to 90$d$ fixedly installed at both sides of the actuator housing 10, and both ends of the first and second rotation shafts 34$a$ and 34$b$ may be rotatably supported by the pair of bearings 65 and 66 disposed in the first to fourth motor housings 90$a$ to 90$d$ to provide stability when the first and second worm gears 35$a$ and 35$b$ are driven.

As described above, in this invention, the length of one motor is divided into both sides, and two bearings 65 and 66 are respectively arranged at both ends of the first and second rotary shafts 34$a$ and 34$b$ to thereby realize a structure capable of achieving the uniform distribution of force and stably accommodating force.

In addition, in the present invention, the first and second worm gears 35$a$ and 35$b$ are disposed at the central portions of the first and second rotating shafts 34$a$ and 34$b$, which are rotated by the first to fourth driving motors 101 to 104, so as to drive the sun gear 70 on both sides thereof, thereby having a more stable structure against vibration and noise.

As the first to fourth driving motors 101 to 104 are arranged inside both sides of the actuator housing 10, the shape of the actuator housing may have a cylindrical shape as a whole.

Moreover, in this invention, as shown in FIG. 8B, both ends of the first to fourth motor housings 90$a$ to 90$d$ may limit the left and right flow of the first and second rotary shafts 34$a$ and 34$b$ by adding set screws 73$a$ and 73$b$ therein, respectively, while serving as bearing housings.

Each of the set screws 73$a$ and 73$b$ may have a male thread formed on the outer circumference of the body, a "–" or "+" groove may be formed at the rear end portion to accommodate the front end of the driver, and the front end thereof may be curved or flat.

The rear ends of the first to fourth motor housings 90$a$ to 90$d$ each have a shape that gradually narrows to serve as a bearing housing, and a female thread is formed in a through-hole penetrating from both ends to the inside. The set screws 73*a* and 73*b* may be screw-coupled to the rear ends of the first to fourth motor housings 90*a* to 90*d* in which female threads are formed, and the front ends of the two set screws 73*a* and 73*b* may be combined in a form of pushing and compressing both ends of the first and second rotary shafts 34*a* and 34*b*.

The set screws 73*a* and 73*b* are preferably installed in both the bearing housings of the two bearings 65 and 66 that rotatably support both ends of the first and second rotary shafts 34*a* and 34*b*. However, the set screws 73*a* and 73*b* may be installed only in one bearing housing to support a one-side end of the rotary shafts, thereby suppressing the left and right flow by pushing the first and second rotary shafts 34*a* and 34*b* in one direction.

As shown in FIGS. 8A to 8F, the first and second motor driving units 100*a* and 100*b* have the first to fourth driving motors 101 to 104 formed at both ends of the first and second rotation shafts 34*a* and 34*b*, respectively, and are disposed inside the first to fourth motor housings 90*a* to 90*d*, respectively.

The first to fourth motor housings 90*a* to 90*d* are assembled so that both ends thereof partially overlap the first to fourth grooves 10*b* to 10*e* of the actuator housing 10, and the both ends are exposed to the outside. As a result, the set screws 73*a* and 73*b* may be manipulated using a driver from the outside, thereby limiting the left and right flow of the first and second rotary shafts 34*a* and 34*b*.

The first to fourth motor housings 90*a* to 90*d* include first and second motor housing main bodies 91*a* and 91*b* forming an inner space in which the first and second rotors 30*a* and 30*b* and the first and second stators 40*a* and 40*b* are accommodated, respectively, and first and second motor housing covers 92*a* and 92*b* coupled to entrances of the first and second motor housing main bodies 91*a* and 91*b*, and are fixed by fastening a plurality of fixing bolts 93 therewith.

The first to fourth driving motors 101 to 104 have first and second rotors 30*a* and 30*b* formed at both ends of the first and second rotary shafts 34*a* and 34*b*, respectively, and first and second stators 40*a* and 40*b* which are arranged with an air gap therebetween outside the first and second rotors 30*a* and 30*b* thereby generating a rotating magnetic field, to rotate the first and second rotors 30*a* and 30*b*.

The first and second rotors 30*a* and 30*b* include magnets 31*a* and 31*b* attached to outer circumferential portions of both ends of the first and second rotation shafts 34*a* and 34*b*, respectively. The magnets 31*a* and 31*b* may include a plurality of N-pole and S-pole split magnet segments, or may use a magnet in which the N-pole and S-pole are split and magnetized into multiple poles in a ring-shaped magnet.

When the first and second rotors 30*a* and 30*b* include split magnet segments of a plurality of N poles and S poles, a plurality of protrusions 32*a* and 32*b* protrude along the outer circumferences at both ends of the first and second rotary shafts 34*a* and 34*b*, respectively, and a plurality of concave grooves 33*a* and 33*b* to which the plurality of magnets 31*a* and 31*b* may be attached are formed between the plurality of protrusions 32*a* and 32*b*, and the plurality of magnets 31*a* and 31*b* are arranged in the plurality of concave grooves 33*a* and 33*b*.

As shown in FIGS. 8A to 8F, the first and second rotation shafts 34*a* and 34*b* of the first and second rotors 30*a* and 30*b* may include the first and second worm gears 35*a* and 35*b* integrally formed in the centers thereof, and the plurality of magnets 31*a* and 31*b* positioned and fixed to both end portions thereof, to which the two magnets 31*a* and 31*b* are magnetized at the same time.

In addition, the first and second rotation shafts 34*a* and 34*b* may be divided into three or two central portions including the first and second rotors 30*a* and 30*b* and the first and second worm gears 35*a* and 35*b*, and then may be assembled using a D-cut structure or another connection method.

Each of the first and second stators 40*a* and 40*b* includes: a stator core 45 having a plurality of teeth 41 each having a "T" shape and a back yoke 42 interconnected with the plurality of teeth 41 to form a magnetic circuit; a bobbin 44 made of an insulating material integrally formed to surround an outer circumferential surface on which a coil 43 of each of the plurality of teeth 41 is wound; and the coil 43 wound around the outer circumferential surfaces of the bobbin 44. The bobbin 44 may be integrally formed as a stator support.

In this case, the bobbin 44 may include upper and lower insulators assembled to surround the back yoke 42 from the top and bottom portions along with the plurality of teeth 41.

In this case, as shown in FIG. 8D, each of the first and second stators 40*a* and 40*b* may have a stator core 45 having a symmetrical structure in which a plurality of teeth 41 protrude from the annular back yoke 42 in a center direction thereof, and as illustrated in FIG. 8C, each of the first and second stators 40*a* and 40*b* may have a stator core 45 having an asymmetrical structure in which a plurality of teeth 41 have different lengths and protrude from the back yoke 42 having an asymmetrical structure in the center direction thereof.

The first and second stators 40*a* and 40*b* having the stator core 45 having the asymmetrical structure may be used to provide a motor structure for maximally utilizing a space inside the actuator housing 10. That is, as shown in FIG. 8A, the first and second stators 40*a* and 40*b* having the stator core 45 having the asymmetrical structure may be applied when the lengths of the plurality of teeth 41 of the stator are extended and the winding amount of the coil 43 is increased, by using the space of the outer sides (i.e., the lower side of FIG. 8A) of the first and second rotary shafts 34*a* and 34*b*.

As shown in FIGS. 4 to 6, the first and second motor driving units 100*a* and 100*b* may include a printed circuit board (PCB) 50 on which one motor driving circuit (i.e., a motor controller) having a Hall sensor assembly is mounted at an intermediate portion between the first and second driving units 100*a* and 100*b*.

In the swivel actuator 200 according to the present invention, the first to fourth driving motors 101 to 104 constituting the first and second motor driving units 100*a* and 100*b* may be configured as a brushless direct-current (BLDC) motor having an 8 pole-6 slot structure, as shown in FIG. 8D. In this case, when coils 43 of the first and second stators 40*a* and 40*b* are wound around the plurality of teeth 41, in the first to fourth driving motors 101 to 104, the coils 43 may be wound around the plurality of teeth 41 in a three-phase (U, V, W) structure, and the other ends of the three-phase (U, V, W) coils 43 may be connected to each other in a Y-connection or star-connection manner.

Furthermore, for example, the first to fourth driving motors 101 to 104 may be driven by a 6-step full-wave driving method using an inverter after receiving a rotor position signal from two or three Hall sensors mounted on a Hall sensor assembly in a motor driving circuit.

The first to fourth driving motors 101 to 104 may be driven using one motor driving circuit (i.e., a motor controller).

In this case, U, V, and W coils 43 may be equally wound around the first and second stators 40*a* and 40*b* of the first to fourth driving motors 101 to 104, respectively, and the U-line and the W-line of the conductive patterns formed on the PCB 50 may be reversely connected.

That is, since one of the first to fourth driving motors 101 to 104 has the opposite rotational direction, two driving motors may be driven in the same direction when the U-line and the W-line are reversely connected with respect to one of the first and second stators 40*a* and 40*b*.

In this case, the positions of the first and second rotors 30*a* and 30*b* and the positions of the stator cores should be located on the same line. That is, one Hall sensor integrated circuit (IC) (i.e., a Hall sensor assembly) for detecting the rotational positions of the first and second rotors 30*a* and 30*b* is used to arrange the position of the rotor or the position of the stator core, and U, V, and W lines according to the rotation direction.

A method of driving the plurality of driving motors using one motor driving circuit (i.e., a motor controller) is summarized as follows.

First, when there are two or more driving motors, U, V, and W phases equally wound around the stator coils of the respective driving motors are wired.

Second, when two driving motors are located in a symmetrical direction, various types of driving motors are generated.

First, when two driving motors are located in the symmetrical directions, the rotation direction of the one driving motor and the rotation direction of the other driving motor positioned opposite to the rotation direction of the one driving motor should be reverse, and thus, the rotation directions of the two driving motors should be rotated in the same direction from the perspective of the rotary shaft.

When the two driving motors are located in the symmetrical direction, and when the two driving motors are wound in the same winding direction, the rotary shaft is rotated in the same direction by equally winding the winding wires, and connecting the U-phase, the V-phase, and the W-phase to each other using the conductive pattern formed on the PCB 50, for motor sharing.

When two driving motors are located in a symmetrical direction, the rotary shaft is rotated in the same direction by reversely winding one driving motor, and connecting the U-phase with the W-phase, the W-phase with the U-phase, and the V-phase with the V-phase, using the conductive pattern formed on the PCB 50.

The hollow swivel actuator 200 according to the present invention generates a high speed rotational output through the first and second worm gears 35*a* and 35*b* of the first and second motor driving units 100*a* and 100*b*, and then transmits the high speed rotational output to the worm wheel of the sun gear 70, thereby obtaining a stable high torque output by performing a large torque conversion due to reduction, and the rotary table 20 is coupled to the upper portion of the sun gear 70 to rotate at a low speed.

As shown in FIG. 7, a stepped portion 70*a* is formed at an inner circumferential portion of the spur gear 70, and a damper ring 63 and a bearing support 64 may be supported by the stepped portion 70*a*, as will be described later.

A needle roller bearing 61 having a cylindrical shape is inserted between a lower portion of the hollow cylindrical portion 11 and the sun gear 70 to rotatably support the sun gear 70, and a table supporting bearing 62 is inserted between an upper portion of the hollow cylindrical portion 11 and a central portion of the rotary table 20.

In addition, a bearing support 64 is inserted between the needle roller bearing 61 and the table support bearing 62, and is press-fitted into the outer circumference of the hollow cylindrical portion 11 to prevent the table support bearing 62 from descending.

Further, a damper ring 63 is inserted into the lower portion of the bearing support 64 to absorb an impact that may be applied to the needle roller bearing 61 when the bearing support 64 is press-fitted into the outer circumference of the hollow cylindrical portion 11.

First, the needle roller bearing 61 is a type of roller bearing capable of withstanding a large radial load compared to a general ball bearing, and includes an outer ring fixed to a movable part and an inner ring installed in a fixed part. In this case, a retainer and a plurality of needle-shaped rollers are inserted into the outer ring.

The inner ring of the needle roller bearing 61 is press-fitted into the outer circumference of the hollow cylindrical portion 11, and the outer ring is fixed to the inner circumference of the sun gear 70.

In addition, the table support bearing 62 may be configured as a ball bearing having a plurality of balls inserted between an inner ring and an outer ring, wherein the inner ring is fixed to the outer circumference of the hollow cylindrical portion 11 and the outer ring is fixed to a bearing housing 26 protruding downward from the center of the rotary table 20.

Furthermore, the hollow swivel actuator 200 has a stopper insertion concave groove 11*b* formed at the upper end portion of the hollow cylindrical portion 11, and a stopper ring 68 is coupled to the stopper insertion concave groove 11*b* to prevent the rotary table 20 from being separated.

The rotary table 20 has the circular upper plate 21 and the side surface portion 23 extending downward from the outer circumference of the upper plate 21. The upper plate 21 has a plurality of coupling holes 22 which are penetratively formed for coupling with a main body, which is a passive body (e.g., electric seat) installed in the rotary table 20.

A central portion of the rotary table 20 is rotatably supported on an outer circumference of the hollow cylindrical portion 11 by a table support bearing 62, and is fixed to an upper portion of the sun gear 70 to rotate together with rotation of the sun gear 70.

The upper plate 21 of the rotary table 20 and the sun gear 70 may be assembled as one of the following methods.

First, gear processing is performed on the outer circumferential surface of the sun gear 70 made of a worm wheel and the sun gear 70 is inserted when performing the die casting of the rotary table 20 (which is called a first method).

Second, the worm wheel is processed on the outer circumferential surface of the sun gear 70 and the rotary table 20 is assembled and fastened with the sun gear 70 by bolts (which is called a second method).

Third, the worm wheel is processed on the outer circumferential surface of the sun gear 70 and the rotary table 20 is assembled with the sun gear 70 in a key and keyway structure (which is called a third method).

In addition, each of the first to fourth driving motors 101 to 104 may be driven by a three-phase driving method, and to this end, the stator coils of the respective driving motors are coil windings wound in a three-phase (U-, V-, and W-phases) driving method.

In this case, the method of assembling the U, V, and W three-phase coils of each of the first to fourth driving motors 101 to 104 to the PCB 50 on which the motor driving circuit is mounted is performed by connecting the U, V, and W three-phase coils to the PCB 50 vertically disposed in the actuator housing 10 using a wire harness perpendicularly from the first to fourth driving motors 101 to 104.

In this case, the PCB 50 formed in a donut shape on a driving motor may be assembled instead of a vertical assembly, and U, V, and W three-phase coils may be soldered or assembled using a press fit by using a wire harness drawn out to an upper side of the driving motor.

A central through-hole 25 through which a cable passes is formed in the center of the upper plate 21, in which a motor driving signal according to the manipulation of a user's car seat control button in the first to fourth driving motors 101 to 104 constituting the first and second motor driving units 100*a* and 100*b* is transmitted to the PCB 50 of a motor driving circuit installed inside the actuator housing 10 through the cable.

In the illustrated embodiment, the PCB 50 of a motor driving circuit is installed in the actuator housing 10. However, the motor driving circuit may be installed outside the actuator housing 10, and a Hall sensor assembly may be mounted on the PCB 50 installed inside the housing to apply U, V, and W signals output from an inverter circuit, signals output from three Hall sensors H1 to H3, a power source voltage Vcc, and a ground voltage GND to the stator coils and the Hall sensor assemblies of the first to fourth driving motors 101 to 104 through the cable from the motor driving circuit installed outside.

Accordingly, the cable may be introduced into the lower portion through the central through-hole 25 provided at the center of the upper plate 21 and the hollow cylindrical portion 11 of the actuator housing 10, and then connected to the PCB 50 through a through-hole formed at the bottom of the actuator housing 10.

As described above, according to the present invention, the first and second motor driving units 100*a* and 100*b* and the sun gear 70 are disposed on the same plane inside the cylindrical housing 10, and the rotary table 20 is directly connected to the upper portion of the sun gear 70, thereby realizing a simple and slim hollow swivel actuator 200.

Hereinafter, an operation of the hollow swivel actuator 200 according to the present invention will be described with reference to FIGS. 1 to 9B.

First, when the first and second motor driving units 100*a* and 100*b* installed at one side of the bottom surface 10*f* of the actuator housing 10 operate, the BLDC type first to fourth driving motors 101 to 104 are driven to generate rotational outputs from the first and second worm gears 35*a* and 35*b* disposed at the centers of the first and second rotation shafts 34*a* and 34*b*.

The first and second worm gears 35*a* and 35*b* are gear-coupled to opposite sides of the sun gear 70 to rotate and drive the worm wheel of the sun gear 70 rotatably supported on the outer circumference of the hollow cylindrical portion 11, to thereby perform reduction.

When the sun gear 70 is rotated, the rotary table 20 coupled to the upper portion of the sun gear 70 is rotated at the same speed to perform a low speed rotation.

As a result, the center portion of the rotary table 20 is rotatably supported by the table support bearing 62 on the outer circumference of the hollow cylindrical portion 11, so that the rotary table 20 may be rotated at a low speed by a stable high torque output as a large torque conversion is performed by the torque conversion according to the reduction.

In the present invention, a first-step reduction ratio RI between the first and second worm gears 35*a* and 35*b* of the first to fourth driving motors 101 to 104 and the worm wheel of the sun gear 70 may be set to 165:1.

For example, when the first to fourth driving motors 101 to 104 are rotated at 330 rpm, the swivel actuator 200 of the present invention is reduced to 165:1 when the reduction ratio of the reducer is 165:1, and the rotary table 20 is reduced to a low speed of 2 rpm and the rotation torque is increased 165 times, resulting in a large torque increase.

When the swivel actuator 200 of the present invention is applied to a car seat in a vehicle, it is possible to rotate the car seat by a desired angle when conducting a meeting or the like inside the vehicle to conduct the meeting while the occupant faces each other.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

The swivel actuator according to the present invention may be applied for rotating a passive object such as a car seat installed on a rotary table so as to rotate left and right together with the rotary table.

What is claimed is:

1. A motor driving device for a hollow swivel actuator, the motor driving device comprising:

an actuator housing having a hollow cylindrical portion protruding upward at a center thereof; and first and second motor driving units disposed on both sides of a bottom surface of the actuator housing to face the hollow cylindrical portion, wherein the first motor driving unit comprises: a first rotary shaft in which a first worm gear, in which a rotational output of a driving motor is generated, is integrally formed at a central portion thereof; and first and second driving motors respectively formed at both ends of the first rotary shaft to rotate the first rotary shaft, and the second motor driving unit comprises: a second rotary shaft in which a second worm gear, in which a rotational output of a driving motor is generated, is integrally formed at a central portion thereof; and third and fourth driving motors respectively formed at both ends of the second rotary shaft to rotate the second rotary shaft, wherein the first and second worm gears are gear-coupled to a sun gear rotatably supported on an outer circumference of the hollow cylindrical portion.

2. The motor driving device of claim 1, wherein the first and second driving motors comprise:

the first rotary shaft in which the first worm gear, in which a rotational output is generated, is integrally formed at a central portion thereof;

first and second motor housings for accommodating both ends of the first rotary shaft, respectively;

first and second rotors having magnets attached to outer circumferential portions of both end portions of the first rotary shaft, respectively; and first and second stators arranged on the outer sides of the first and second rotors with air gaps and configured to generate rotating magnetic fields to rotate the first rotary shaft of the first and second rotors, respectively.

3. The motor driving device of claim 2, further comprising:

first and second bearings installed in the first and second motor housings to rotatably support the first rotation shaft; and first and second set screws which are screw-coupled to both ends of the first and second motor housings, respectively, and enable the front ends to press and support the ends of the first rotary shaft to suppress the flow of the first rotary shaft.

4. The motor driving device of claim 3, wherein the first and second motor housings are assembled such that both ends thereof partially overlap the first and second grooves formed in the circular wall of the actuator housing, and the first and second set screws are configured to be manipulated using a driver from the outside.

5. The motor driving device of claim 2, wherein the first rotary shaft is divided into three or two central portions where the first and second rotors and the first and second worm gears are formed, and is coupled using a D-cut structure.

6. The motor driving device of claim 2, wherein the first and second motor housings further comprise first and second brackets protruding from the inside and the outside, respectively, and used to fix the first and second motor housings to the actuator housing.

7. The motor driving device of claim 6, wherein the first brackets protruding from the outer sides of the first and second motor housings are assembled and fixed to overlap third and fourth grooves formed in the circular wall of the actuator housing, respectively, and the second brackets protruding from the inner sides of the first and second motor housings are respectively fixed to first and second protruding fixing parts protruding from the bottom surface of the actuator housing.

8. The motor driving device of claim 1, further comprising first and second through-holes in which the first and second motor housings are assembled such that the bottom surfaces of the first and second motor housings are flush with the rear surface of the actuator housing when the first and second motor housings are assembled to the bottom surface of the actuator housing.

9. The motor driving device of claim 1, wherein each of the first and second stators comprises:

a stator core having a plurality of teeth each having a "T" shape and a back yoke interconnected with the plurality of teeth to form a magnetic circuit;

a bobbin integrally formed to surround an outer circumferential surface on which a coil of each of the plurality of teeth is wound; and a coil wound around the outer circumferential surfaces of the bobbins, wherein the plurality of teeth and the back yoke have an asymmetric structure.

10. A motor driving device for a hollow swivel actuator, the motor driving device comprising:

an actuator housing having a hollow cylindrical portion protruding upward at a center thereof; and first and second motor driving units which are disposed on both sides of the bottom surface of the actuator housing to face the hollow cylindrical portion, respectively, and which include first to fourth driving motors formed at both ends of the first and second rotary shafts, respectively, and first and second worm gears, which generate rotational outputs of the first to fourth driving motors, and are integrally formed at the centers of the first and second rotary shafts, respectively, wherein the first and second worm gears are gear-coupled to a sun gear rotatably supported on an outer circumference of the hollow cylindrical portion.

11. A hollow swivel actuator comprising:

an actuator housing having a hollow cylindrical portion protruding upward at a center thereof;

first and second motor driving units which are disposed on both sides of the bottom surface of the actuator housing to face the hollow cylindrical portion, respectively, and which include first to fourth driving motors formed at both ends of the first and second rotary shafts, respectively, and first and second worm gears, which generate rotational outputs of the first to fourth driving motors, and are integrally formed at the centers of the first and second rotary shafts, respectively;

a sun gear rotatably supported on the outer circumference of the hollow cylindrical portion and having a worm wheel integrally formed on the outer circumference thereof and gear-coupled to the first and second worm gears to allow deceleration; and a rotary table having the center part thereof rotatably supported on the outer circumference of the hollow cylindrical portion, the lower end of the center part being coupled to the top end of the sun gear.

12. The hollow swivel actuator of claim 11, further comprising a first bearing disposed between the lower end of the hollow cylindrical portion and the sun gear to rotatably support the sun gear;

a second bearing rotatably supporting the rotary table on an outer circumference of a top end of the hollow cylindrical portion; and a bearing support press-coupled to the outer circumference of the hollow cylindrical portion and disposed between the first bearing and the second bearing.

13. The hollow swivel actuator of claim 12, wherein the first bearing includes a needle roller bearing, and the second bearing includes a ball bearing.

14. The hollow swivel actuator of claim 11, wherein the first to fourth driving motors and the sun gear of the motor driving unit are arranged on the same plane on the bottom surface of the actuator housing.

15. The hollow swivel actuator of claim 11, further comprising a motor driving circuit mounted on a printed circuit board (PCB) installed inside the actuator housing to apply motor driving signals to the first to fourth driving motors according to manipulation of a car seat control button of a user, wherein the rotary table is used for rotation driving of a car seat.

* * * * *